(12) United States Patent
Thyamagondlu et al.

(10) Patent No.: US 12,411,785 B2
(45) Date of Patent: Sep. 9, 2025

(54) DIRECT MEMORY ACCESS SYSTEM WITH READ REASSEMBLY CIRCUIT

(71) Applicant: Xilinx, Inc., San Jose, CA (US)

(72) Inventors: Chandrasekhar S. Thyamagondlu, Saratoga, CA (US); Nicholas Trank, San Francisco, CA (US)

(73) Assignee: Xilinx, Inc., San Jose, CA (US)

( * ) Notice: Subject to any disclaimer, the term of this patent is extended or adjusted under 35 U.S.C. 154(b) by 111 days.

(21) Appl. No.: 18/193,129

(22) Filed: Mar. 30, 2023

(65) Prior Publication Data

US 2024/0330216 A1 Oct. 3, 2024

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ....... G06F 13/28; G06F 13/1684; G06F 13/16
See application file for complete search history.

(56) References Cited

U.S. PATENT DOCUMENTS

| | | | |
|---|---|---|---|
| 6,701,393 B1 | 3/2004 | Kemeny | |
| 7,047,362 B2 | 5/2006 | Kim | |
| 7,577,773 B1 | 8/2009 | Gandhi | |
| 9,292,436 B2 | 3/2016 | Wingard | |
| 9,952,991 B1 | 4/2018 | Bruce | |
| 10,474,610 B1* | 11/2019 | Schelle | G06F 11/3636 |
| 10,983,920 B2 | 4/2021 | Thyamagondlu et al. | |
| 11,232,053 B1 | 1/2022 | Thyamagondlu et al. | |
| 11,500,779 B1 | 11/2022 | Mukherjee | |
| 11,983,128 B1 | 5/2024 | Xu | |
| 2003/0131198 A1 | 7/2003 | Wolrich | |
| 2006/0173970 A1 | 8/2006 | Pope | |
| 2008/0168259 A1 | 7/2008 | Biran | |
| 2011/0219208 A1 | 9/2011 | Asaad | |
| 2012/0254499 A1 | 10/2012 | Hashimoto | |
| 2014/0181410 A1 | 6/2014 | Kalamatianos | |
| 2014/0195788 A1 | 7/2014 | Kalogeropulos | |
| 2014/0317357 A1 | 10/2014 | Kaplan | |
| 2014/0344485 A1 | 11/2014 | Dondini | |
| 2015/0180782 A1 | 6/2015 | Rimmer | |
| 2015/0347292 A1* | 12/2015 | Fujita | G06F 3/0649 711/103 |
| 2016/0173398 A1 | 6/2016 | Reinig | |
| 2016/0292100 A1 | 10/2016 | Olcay | |

(Continued)

*Primary Examiner* — Getente A Yimer
(74) *Attorney, Agent, or Firm* — Kevin T. Cuenot

(57) ABSTRACT

A direct memory access (DMA) system includes a plurality of read circuits and a switch coupled to a plurality of data port controllers configured to communicate with one or more data processing systems. The DMA system includes a read scheduler circuit coupled to the plurality of read circuits and the switch. The read scheduler circuit is configured to receive read requests from the plurality of read circuits, request allocation of entries of a data memory for the read requests, and submit the read requests to the one more data processing systems via the switch. The DMA system includes a read reassembly circuit coupled to the plurality of read circuits, the switch, and the read scheduler circuit. The read reassembly circuit is configured to reorder read completion data received from the switch for the read requests and provide read completion data, as reordered, to the plurality of read circuits.

12 Claims, 5 Drawing Sheets

(56) References Cited

U.S. PATENT DOCUMENTS

| | | |
|---|---|---|
| 2017/0131904 A1* | 5/2017 | Rajwade ............... G06F 3/0673 |
| 2020/0117626 A1* | 4/2020 | Karguth ................. G06F 13/28 |
| 2020/0151120 A1* | 5/2020 | Thyamagondlu ... G06F 13/4027 |
| 2021/0014177 A1 | 1/2021 | Kasichainula |
| 2021/0117360 A1 | 4/2021 | Kutch |
| 2021/0303570 A1 | 9/2021 | Kodiles |
| 2022/0005521 A1* | 1/2022 | Sethuraman ........ G06F 13/1684 |
| 2022/0374150 A1 | 11/2022 | Capri |
| 2023/0185745 A1* | 6/2023 | Wu ........................ G06F 13/28 |
| | | 710/22 |
| 2023/0298128 A1 | 9/2023 | Puffer |
| 2024/0086356 A1 | 3/2024 | Ray |
| 2024/0118702 A1 | 4/2024 | Cella |
| 2024/0330191 A1 | 10/2024 | Thyamagondlu et al. |
| 2024/0330213 A1 | 10/2024 | Thyamagondlu et al. |
| 2024/0330215 A1 | 10/2024 | Thyamagondlu et al. |
| 2025/0004961 A1 | 1/2025 | Thyamagondlu |

* cited by examiner

DIRECT MEMORY ACCESS SYSTEM WITH READ REASSEMBLY CIRCUIT

TECHNICAL FIELD

This disclosure relates to integrated circuits (ICs) and, more particularly, to a direct memory access system having a read reassembly circuit.

BACKGROUND

Many modern computing environments include one or more host data processing systems (host systems) coupled to one or more peripheral devices. An example of a peripheral device is a hardware accelerator. The host system(s) may offload tasks to be performed by the peripheral devices. A peripheral device may include one or more compute circuits. To facilitate data movement between the host system(s) and the compute circuits of a peripheral device, the peripheral device may include a Direct Memory Access (DMA) system. The DMA system facilitates data movement between memory of the host system(s) that corresponds to different processes, functions, and/or applications executing therein and the compute circuits of the peripheral device.

Within the peripheral device, the DMA system includes a plurality of different read circuits and a plurality of different write circuits that effectuate DMA data transfers. The read circuits are responsible for reading data from the host system(s) while the write circuits are responsible for writing data to the host system(s). Each read circuit typically includes a reorder buffer and reorder logic capable for reassembling data received in response to read requests submitted by that read circuit.

This approach to DMA system implementation has various limitations. For example, duplicating reorder buffers and reorder logic across each different read circuit increases the resources required to implement the DMA system in the peripheral device. Flexible multi-channel operation is also limited. In addition, bandwidth of the DMA system may be throttled (e.g., reduced) by the latency of the slowest read request undergoing processing.

SUMMARY

One or more example implementations relate to a direct memory access (DMA) system. The DMA system includes a plurality of read circuits. The DMA system includes a switch coupled to a plurality of data port controllers configured to communicate with one or more data processing systems. The DMA system includes a read scheduler circuit coupled to the plurality of read circuits and the switch. The read scheduler circuit is configured to receive read requests from the plurality of read circuits, request allocation of entries of a data memory for the read requests, and submit the read requests to the one more data processing systems via the switch. The DMA system includes a read reassembly circuit coupled to the plurality of read circuits, the switch, and the read scheduler circuit. The read reassembly circuit is configured to reorder read completion data received from the switch for the read requests and provide read completion data, as reordered, to the plurality of read circuits.

The foregoing and other implementations can each optionally include one or more of the following features, alone or in combination. Some example implementations include all the following features in combination.

In some aspects, the read scheduler circuit, for each read request, determines a number of the entries of the data memory required for the read request and requests allocation of the number of entries of the data memory for the read request from the read reassembly circuit.

In some aspects, the read reassembly circuit assigns tags to the read requests and stores associations between the tags, the read requests, and the entries of the data memory as allocated.

In some aspects, the read reassembly circuit is configured to notify respective read circuits that data is available in response to receiving individual beats of data for the read requests and storing the beats of data in the entries of the data memory as allocated.

In some aspects, the read reassembly circuit is configured to provide beats of read completion data from the entries of the data memory in response to receiving dequeue requests corresponding to the read requests.

One or more example implementations relate to a DMA system having a read reassembly circuit. The read reassembly circuit includes an allocation state machine circuit configured to receive read requests from a plurality of read circuits of the DMA system and allocate entries of a data memory to the read requests as received. The read reassembly circuit includes an enqueue linked list circuit configured to receive beats of data for the read requests and store the beats of data in the entries of the data memory based on the allocation performed by the allocation state machine circuit. The read reassembly circuit includes a status subsystem configured to notify respective read circuits of the plurality of read circuits that data for the read requests submitted by the respective read circuits is available. The read reassembly circuit includes a dequeue subsystem configured to receive dequeue requests from the respective read circuits of the plurality of read circuits and, in response to the dequeue requests, provide data obtained from the entries of the data memory to the respective read circuits.

The foregoing and other implementations can each optionally include one or more of the following features, alone or in combination. Some example implementations include all the following features in combination.

In some aspects, the allocation state machine circuit allocates a number of entries in the data memory to each read request based on an amount of data to be returned in response to the read request.

In some aspects, the status subsystem is operable to notify the respective read circuits in response to storing the beats of data in the entries of the data memory.

In some aspects, the status subsystem includes an array tracking circuit configured to store indications of which entries of the data memory store valid data returned for the read requests. The status subsystem includes a status linked list circuit configured to correlate pointers to entries assigned to the read requests with a plurality of virtual channels assigned to the plurality of read circuits. The pointers (and entries) are further correlated with the indications stored in the array tracking circuit. The status subsystem includes a status state machine circuit configured to generate notifications directed to respective read circuits for selected virtual channels that have data available for the read requests.

In some aspects, each read circuit of the plurality of read circuits is allocated one or more virtual channels of a plurality of virtual channels. The dequeue subsystem provides the data to the respective read circuits in-order on a per read request basis and in-order on a per virtual channel basis.

In some aspects, the dequeue subsystem includes a dequeue arbitration circuit configured to receive the dequeue requests and arbitrate among the dequeue requests as received.

In some aspects, each dequeue request specifies a virtual channel. The dequeue subsystem includes a dequeue linked list circuit configured to initiate read operations to the data memory for data stored in the entries of the data memory allocated to the read requests based on a virtual channel specified by each dequeue request. The dequeue linked list circuit initiates the read operations in an order determined by the dequeue arbitration circuit.

One or more example implementations relate to a method of data re-ordering for a DMA system. The method includes receiving read requests from a plurality of read circuits of the DMA system. The method includes allocating entries of a data memory to the read requests. The method includes, in response to receiving beats of data for the read requests, storing the beats of data in the entries of the data memory as allocated. The method includes, in response to storing the beats of data in the entries, notifying respective read circuits of the plurality of read circuits that data for the read requests submitted by the respective read circuits is available. The method includes sending data obtained from the entries of the data memory to the respective read circuits in response to receiving dequeue requests from the respective read circuits. The data is provided in-order on a per read request basis and/or in-order on a per virtual channel basis.

The foregoing and other implementations can each optionally include one or more of the following features, alone or in combination. Some example implementations include all the following features in combination.

In some aspects, entries of the data memory are allocated prior to submission of the read requests to another data processing system.

In some aspects, each read circuit of the plurality of read circuits is allocated one or more virtual channels of a plurality of virtual channels. Each read request specifies a particular virtual channel allocated to a particular read circuit that issued the read request. Accordingly, the data is provided in-order on a per virtual channel basis.

In some aspects, the method includes assigning tags to the read requests as received.

In some aspects, the method includes storing associations between the tags assigned to the read requests and the entries as allocated to the read requests.

In some aspects, for each beat of data received responsive to a read request, the method includes determining the tag specified by the beat of data and storing the beat of data in a selected entry of the data memory that is allocated to the read request having a same tag as the beat of data based on the stored associations.

In some aspects, each read circuit of the plurality of read circuits is allocated one or more virtual channels of a plurality of virtual channels. Accordingly, the method includes storing associations between entries of the data memory that store valid data for the read requests and the plurality of virtual channels. The method includes determining selected virtual channels associated with the entries in the data memory storing valid data. The method includes providing notifications to the respective read circuits based on the selected virtual channels.

In some aspects, the method includes receiving the dequeue requests from the respective read circuits. The method includes arbitrating among the dequeue requests. The method includes sending in-order data to each respective read circuit based on the arbitrating.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
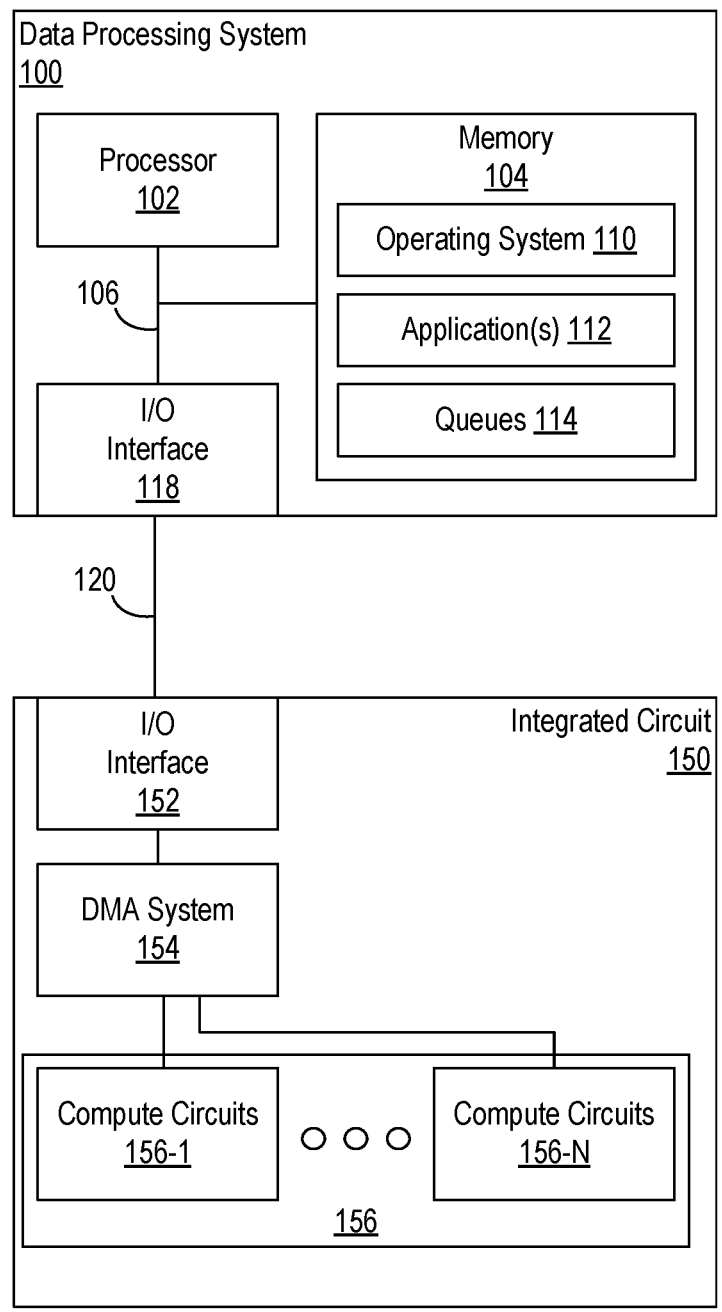
FIG. 1 illustrates an example computing system including a direct memory access (DMA) system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a direct memory access (DMA) system having a read reassembly circuit (RRC). The DMA system may be implemented as a multi-queue DMA system. In accordance with the inventive arrangements described within this disclosure, a DMA system is disclosed that includes a centralized or shared RRC. Rather than duplicating reorder buffers and reorder logic across different read circuits of the DMA system, a single, centralized RRC is provided that may be shared among the different read circuits of the DMA system. A DMA system having an architecture as described herein may be implemented within an IC using less area. The DMA system implemented as described herein also may consume less power compared to other implementations that have reorder buffers and/or logic duplicated across multiple read circuits.

In accordance with the inventive arrangements described herein, the RRC may be included in the DMA system to provide storage space that may be shared among the different read circuits. The shared storage space of the RRC may be accessed by each (e.g., all) read circuits of the DMA system. The shared storage space may be flexibly and dynamically allocated among different active virtual channels (described below) of the read circuits. Thus, those virtual channels that are not active or are not being used by the read circuits, do not consume resources of the RRC.

In one or more example implementations, the RRC is capable of using linked list subsystems that support and/or maintain a plurality of reordering domains. These reordering domains provide non-blocking operation (e.g., non-blocking DMA processes). Each of the reordering domains, also referred to herein as a virtual channel, may utilize the full capacity of the shared storage space. The RRC implementations described herein are capable of making data available to the read engines as soon as, e.g., responsive to, a first beat of completion data being received for a read request.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing system in which the inventive arrangements may be implemented. As shown, the example computing system of FIG. 1 includes a data processing system 100 coupled to an IC 150. IC 150 is an example of a peripheral device of data processing system 100. For instance, IC 150 may be a hardware accelerator. Though not illustrated, IC 150 may be disposed on a circuit board. The circuit board may have volatile memory such as random-access memory (RAM) (not shown) and/or non-volatile memory (not shown) disposed thereon and coupled to IC 150.

In one aspect, the circuit board may be implemented with a card type of form factor allowing the circuit board to be inserted into a card slot, e.g., an available bus (e.g., Peripheral Component Interconnect Express (PCIe)) slot, of data processing system 100. It should be appreciated, however, that the circuit board may have any of a variety of different form factors so long as IC 150 is coupled to data processing system 100.

Data processing system 100 can include a processor 102, a memory 104, a bus 106, and an input/output (I/O) interface 118. Bus 106 couples processor 102 with memory 104 and I/O interface 118. Data processing system 100 is an example implementation of a host system. It should be appreciated that data processing system 100 is only one example implementation. Data processing system 100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. Data processing system 100 may include a plurality of host systems that are virtualized (e.g., virtual machines, containers, etc.).

Processor 102 is a hardware processor and may be implemented as one or more hardware processors. In an example, processor 102 is implemented as a Central Processing Unit (CPU). Processor 102 may be implemented as one or more circuits capable of carrying out instructions contained in computer-readable program code or instructions. Processor 102 may be implemented using a complex instruction set computer architecture (CISC), a reduced instruction set computer architecture (RISC), a vector processing architecture, or other known and/or to be developed architectures. Example processors include, but are not limited to, processors having an x86 type of architecture (IA-32, IA-64, etc.), Power Architecture, ARM processors, and the like.

Bus 106 represents one or more of any of a variety of communication bus structures. By way of example, and not limitation, bus 106 may be implemented as a PCIe bus.

Data processing system 100 typically includes a variety of computer system readable media illustrated as memory 104. Such media may include computer-readable volatile and non-volatile media and computer-readable removable and non-removable media. For example, memory 104 can include computer-readable media in the form of volatile memory, such as RAM and/or cache memory. Data processing system 100 also can include other removable/non-removable, volatile/non-volatile computer storage media. By way of example, memory 104 may include a storage system capable of reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each form of media can be connected to bus 106 by one or more data media interfaces. Memory 104 is an example of at least one computer program product.

Memory 104 is capable of storing program instructions that are executable by processor 102. For example, the program instructions can include an operating system 110, one or more application programs 112, other program code, and program data. In the example, memory 104 stores program data such as a plurality of queues 114 of data. Processor 102, in executing the program instructions, is capable of performing the various operations described herein attributable to a host system.

It should be appreciated that data items used, generated, and/or operated upon by data processing system 100 are functional data structures that impart functionality when employed by data processing system 100. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor. Referring to data processing system 100 and/or IC 150, linked lists are examples of data structures.

I/O interface 118 allows data processing system 100 to communicate with one or more peripheral devices such as IC 150. Examples of I/O interface 118 may include, but are not limited to, network cards, modems, network adapters, hardware controllers, etc. In an example implementation, I/O interface 118 includes a PCIe interface or adapter.

IC 150 may be implemented as any of a variety of different types of ICs. For example, IC 150 may be implemented as a System-on-Chip (SoC), an Application-Specific IC (ASIC), an adaptive IC such as a Field Programmable Gate Array (FPGA), or the like. An adaptive IC is an IC that may be updated subsequent to deployment of the device into the field. An adaptive IC may be optimized, e.g., configured or reconfigured, for performing particular operations after deployment. The optimization may be performed repeatedly over time to meet different requirements or needs.

In the example of FIG. 1, IC 150 includes an I/O interface 152, a DMA system 154, and one or more compute circuits 156 (e.g., 156-1 through 156-N). As illustrated, I/O interface 152 is coupled to DMA system 154. In the example, I/O interface 152 may be implemented as a PCIe interface or adapter. Data processing system 100 and IC 150 communicate over a communication link 120 using their respective I/O interfaces 118, 152. In an example implementation, communication link 120 may be implemented as a PCIe connection.

DMA system 154 is an example of a multi-queue DMA system in reference to being capable of accessing a plurality of the queues 114 in memory 104 and/or in other host systems. DMA system 154 is coupled to compute circuits 156. Compute circuits 156 may be implemented as any of a variety of different types of circuits to which computing tasks or jobs may be offloaded. For example, compute circuits 156 may be hardened (e.g., ASICs), user-specified circuits implemented using programmable circuitry (e.g., programmable logic such as FPGA gates and/or logic circuitry), third-party Intellectual Property Cores whether implemented as hardened circuits or in programmable circuitry, a data processing circuit array or portions thereof, graphics processing units (GPUs), other hardware processors (e.g., whether hardened or implemented using programmable circuitry), or any combination thereof. In one or more example implementations, one or more of compute circuits 156 may be implemented as a Network Interface Card (NIC).

In general, DMA system 154 is configured to exchange data between data processing system 100 and IC 150. More particularly, DMA system 154 is configured to exchange data between one or more processes, applications, and/or functions executing in data processing system 100 and the various compute circuits 156 of IC 150 by way of communication link 120. Though one data processing system is illustrated, it should be appreciated that IC 150 may be accessed by and/or coupled to a plurality of different host systems including one or more virtualized systems by way of DMA system 154 communicating over a plurality of communication links.

In the example, DMA system 154 may be implemented entirely as hardened circuitry (e.g., ASIC circuitry), entirely using programmable circuitry (e.g., programmable logic such as FPGA programmable logic), or a combination of one or more hardened circuit blocks and one or more circuit blocks implemented in programmable circuitry.

Figure 2:
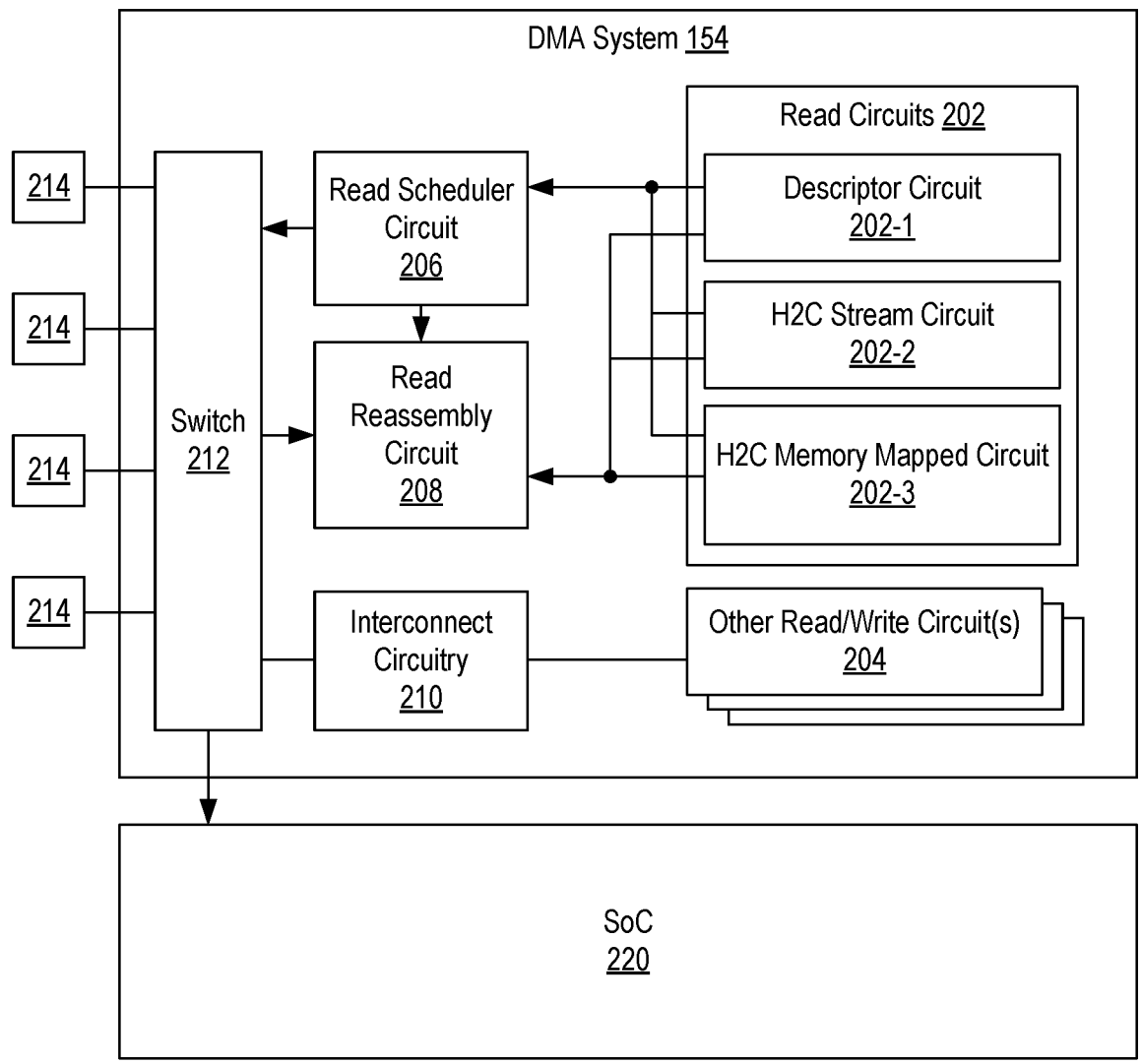
FIG. 2 illustrates an example implementation of the DMA system of FIG. 1.

FIG. 2 illustrates an example implementation of DMA system 154 of FIG. 1. In the example of FIG. 2, a more detailed example of DMA system 154 is illustrated. It should be appreciated that the particular architecture shown in FIG. 2 is provided for purposes of illustration and not limitation. For example, DMA system 154 may include fewer or more of the circuits illustrated and/or circuits of different varieties than shown.

In the example, DMA system 154 includes a plurality of read circuits 202. In the example, read circuits 202 include a descriptor circuit 202-1, an H2C stream circuit 202-2, and an H2C memory mapped circuit 202-3. DMA system 154 may include one or more additional read and/or write circuits 204. For example, other read and/or write circuits 204 may include a C2H stream circuit, a C2H memory mapped circuit, and/or a fetch circuit.

The term "C2H" means "card-to-host" referring to the case where IC 150 sends (e.g., writes) data to one or more host systems such as data processing system 100. The term "H2C" means "host-to-card" referring to the case where the host system sends data to IC 150. In this regard, H2C refers to the case where IC 150 reads data from the host system(s). It should be appreciated that C2H and H2C represent the direction of data flow. As such, regardless of whether the data flow is in the C2H or H2C direction, signals may be sent bidirectionally to send data and/or receive any replies and/or acknowledgements. In the example, one or more of the circuits illustrated may be implemented as a multi-queued design.

In the example, each of read circuits 202 is coupled to a read scheduler circuit 206 and an RRC 208. Read scheduler circuit 206 and RRC 208 are coupled to a switch 212. Other read/write circuits 204 may be coupled to switch 212 via interconnect circuitry 210. In one or more other example implementations, other read/write circuits 204 may be coupled to switch 212 directly (e.g., where interconnect circuitry 210 is omitted).

In the example of FIG. 2, switch 212 is coupled to one or more controllers 214. In some aspects, one or more or all (e.g., each) of controllers 214 may be implemented as a bus controller. An example of a bus controller is a PCIe controller. Each of controllers 214 may be configured to communicate over a respective port and communication link with a particular host system (not shown).

Switch 212 is also coupled to other circuit resources of IC 150 illustrated as System-on-Chip (SoC) 220. In the example, SoC 220 represents a variety of different circuits and/or systems. For example, SoC 220 may represent and/or include circuits and/or systems such as, Application-Specific IC (ASIC or hardened) circuit blocks, user circuitry implemented in programmable logic and/or circuitry, one or more processors capable of executing program code (e.g., a processor system), a programmable network-on-chip, a data processing array, and/or various combinations thereof. Referring to the example of FIG. 1, SoC 220 may include compute circuits 156. In the example, compute circuits 156 may be coupled to DMA system 154 via switch 212. In addition and/or in the alternative, compute circuits 156 may be coupled to individual ones of the read circuits 202 and/or other read/write circuits 204 via one or more direct connections (not shown).

In the example of FIG. 2, switch 212 may implement connections to SoC 220 as one or more AXI interfaces (e.g., streaming and/or memory mapped) in reference to the Advanced Microcontroller Bus Architecture (AMBA) extensible Interface (AXI) protocol. It should be appreciated that other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

In one or more examples, packets from a network (not shown) may be sent to read circuits DMA system 154. Similarly, write circuits of DMA system 154 may send packets to the network. This allows both the host system(s) and the SoC to utilize the same driver for communication via DMA system 154.

In the example of FIG. 2, read scheduler circuit 206 and RRC 208 are disposed between the read circuits 202 and switch 212. For example, read scheduler circuit 206 and RRC 208 are placed between the PCIe portion of DMA system 154 as represented by switch 212 and controllers 214 and AXI memory mapped interfaces of the respective read circuits 202 that couple to read scheduler circuit 206 and RRC 208. In this regard, both read scheduler circuit 206 and RRC 208 are shared by the plurality of read circuits 202. As such, individual ones of read circuits 202 do not include reorder buffers and/or reorder logic as such functionality is provided by RRC 208.

Read scheduler circuit 206 is capable of scheduling read requests submitted by read circuits 202 using an available and/or known arbitration scheme to fairly arbitrate across the different read circuits 202. The read requests may be descriptor fetches, H2C stream read requests, and/or memory mapped read requests from the respective read circuits 202 illustrated.

In one or more examples, read circuits 202 may utilize a plurality of virtual channels implemented in DMA system 154. In the example, DMA system 154 uses 24 virtual channels. The particular number of virtual channels used, however, is not intended as a limitation. It should be appreciated that the particular number of virtual channels may be higher or lower than described.

In one or more example implementations, read scheduler circuit 206 may include packet formation circuitry. The packet formation circuitry is capable of generating Transaction Layer Packets (TLPs) from data received for transmission to host system(s) via switch 212 and controllers 214. The packet formation circuitry may also convert received TLPs from the one or more host systems into an internal packet format utilized by DMA system 154 and or IC 150 (e.g., AXI compatible packets). Though not illustrated, packet formation circuitry may be included in other circuits of DMA system 154 for performing data/packet conversions on outgoing from other DMA system 154 circuits and/or incoming data directed to other DMA system 154 circuits. For example, packet formation circuitry may be incorporated into interconnect circuitry 210.

In accordance with the inventive arrangements, read scheduler circuit 206 is capable of communicating with RRC 208 to allocate space in memory before committing (e.g., sending) read requests to host system(s) via controllers 214. In general, RRC 208 is capable of assigning a Composable Streaming Interconnect (CSI) tag to each read request. The CSI tag may be included in the read request and also included in the read completions (e.g., data returned in fulfillment of the read request). Use of the CSI tag allows RRC 208 to reorder data so that such returned data may be provided to the respective read circuits 202 in order. In one or more example implementations, the CSI tag may be implemented as a 10-bit tag. This example implementation allows RRC 208 to handle up to 1024 different read requests, where each read request is assigned a unique CSI tag. The particular size of the CSI tag used herein, however, is not intended as a limitation. Other sizes of fewer or more than 10 bits may be used.

The CSI tags and tagging capabilities described herein are independent of the tagging features supported by different versions of the PCIe specification. In this regard, DMA system 154 may include additional circuitry that is capable of translating or converting back and forth between PCIe tags and CSI tags. Such translation circuitry may be disposed between switch 212 and the respective ones of controllers 214. The tag translation circuitry is capable of mapping CSI tags to PCIe tags for translating from CSI tags to PCIe tags and vice versa.

In the example, RRC 208 supports 24 virtual channels that enable parallel read completion handling. Use of virtual channels by RRC 208 avoids head-of-line blocking while servicing read requests. The 24 virtual channels may be allocated among different ones of read circuits 202. In one or more examples, the particular number of virtual channels allocated to the different read circuits 202 may be configurable and, as such, adjustable based on user requirements. The allocation of virtual channels to different read circuits 202 may be performed at initialization of DMA system 154 based on user provided configuration data. For example, up to 12 virtual channels may be allocated to descriptor circuit 202-1. Up to 12 virtual channels may be allocated to H2C stream circuit 202-2. Up to 8 virtual channels may be allocated to H2C memory mapped circuit 202-3. As noted, the particular number of virtual channels supported is not intended as a limitation. The total number of virtual channels supported as well as the maximum number of virtual channels permitted to be allocated to the various circuits may be higher or lower than described.

Figure 3:
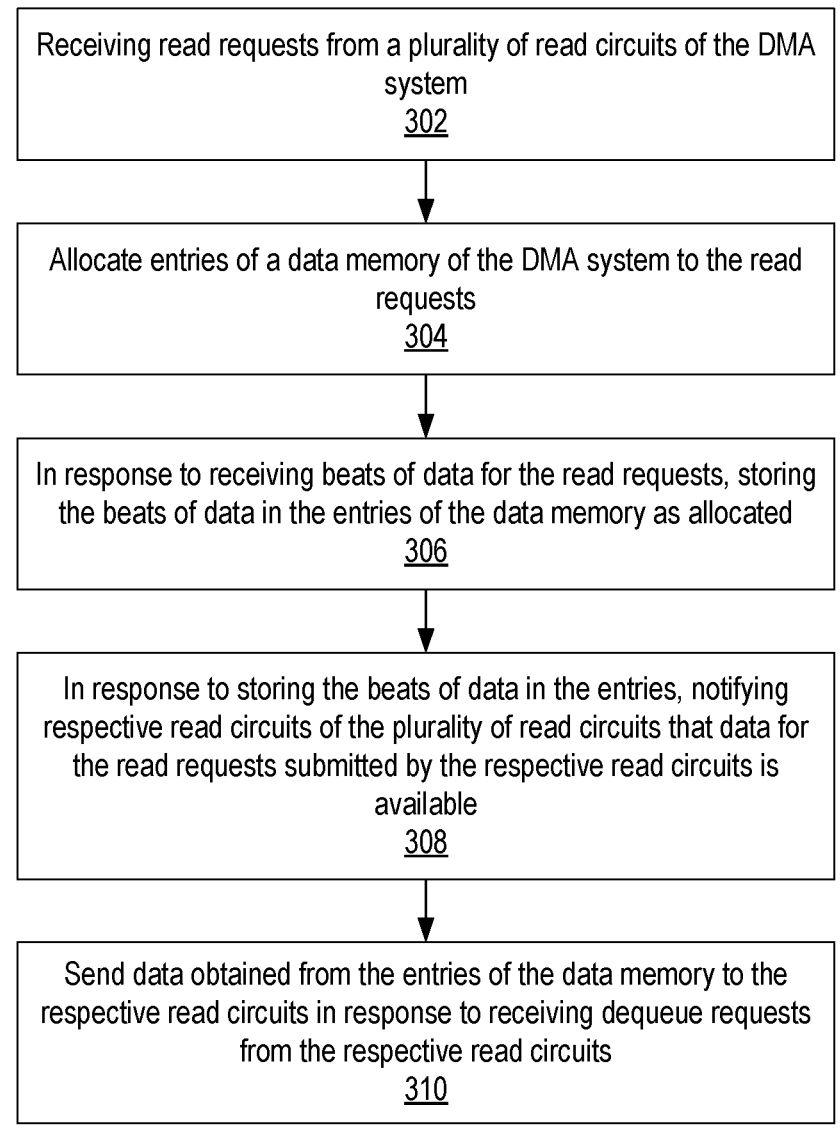
FIG. 3 illustrates an example method of operation of the DMA system of FIGS. 1 and 2.

FIG. 3 illustrates an example method 300 of operation of DMA system 154 and, more particularly, read scheduler circuit 206 and RRC 208. Method 300 illustrates an example of the data re-ordering that is performed by RRC 208 as part of DMA system 154.

In block 302, read requests from one or more of the read circuits 202 are received. The read requests may be received by read scheduler circuit 206, decoded, and provided to RRC 208 for purposes of allocating space in a data memory (e.g., a memory internal to IC 150 or external to IC 150) prior to committing the read requests. In block 304, RRC 208 is capable of allocating entries of the data memory to the read requests. In block 306, in response to receiving beats of data for the read requests, RRC 208 is capable of storing the beats of data in the entries of the data memory as allocated.

In block 308, in response to storing the beats of data in the entries, RRC 208 is capable of notifying respective read circuits 202 that data for the read requests submitted by the respective read circuits 202 is available. In block 310, RRC 208 is capable of sending data obtained from the entries of the data memory to the respective read circuits in response to receiving dequeue requests from the respective read circuits. The data provided to read circuits 202 is provided in-order on a per read request basis and on a per virtual channel basis as described in greater detail hereinbelow.

Figure 4:
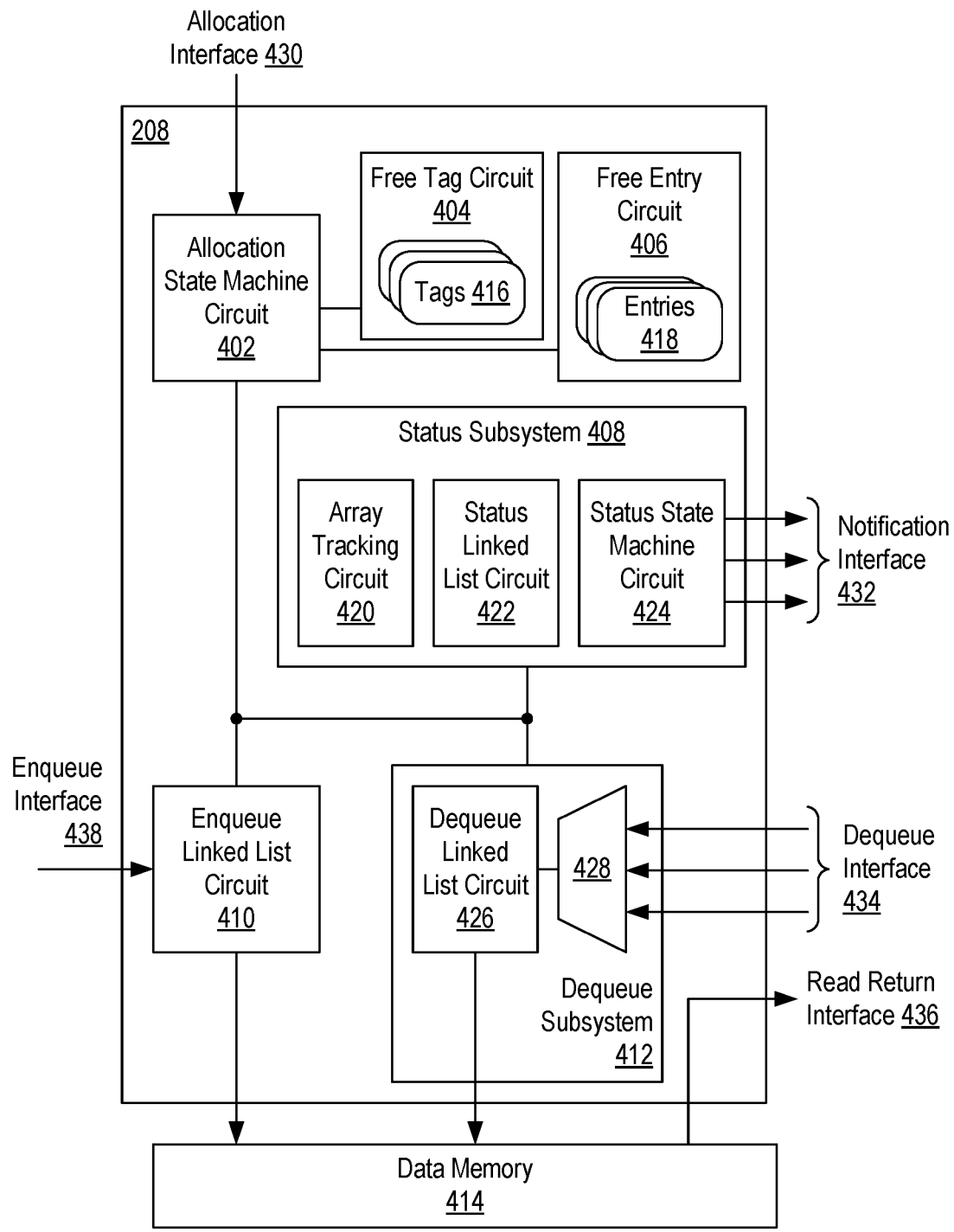
FIG. 4 illustrates an example implementation of a read reassembly circuit of the DMA system of FIGS. 1 and 2.

FIG. 4 illustrates an example implementation of RRC 208 of FIG. 2. In the example, RRC 208 includes an allocation state machine circuit 402, a free tag circuit 404, a free entry circuit 406, a status subsystem 408, an enqueue linked list circuit 410, and a dequeue subsystem 412.

In the example, a data memory 414 (e.g., a RAM) is illustrated. In one or more examples, data memory 414 is separate from RRC 208 and/or DMA system 154. For example, data memory 414 may be implemented as a memory that is coupled to IC 150 but external to IC 150. For instance, data memory 414 may be disposed on a circuit board and coupled to IC 150. In one or more other examples, data memory 414 is implemented in IC 150. In one or more examples, data memory 414 may be implemented or included as part of RRC 208.

In the example, free tag circuit 404 maintains a list of CSI tags 416 that are free or available for assignment to incoming read requests. Free entry circuit 406 is capable of maintaining a list of entries 418 of data memory 414. Entries 418, as stored in free entry circuit 406, are pointers to free or available entries of data memory 414. Data memory 414 may include sufficient space for 1024 entries to support the number of read requests that may be handled concurrently by DMA system 154. In one or more example implementations, each entry may store 128 bytes of data (e.g., payload). It should be appreciated that the particular data and/or memory sizes described herein are for purposes of illustration and not limitation.

In the example, status subsystem 408 can include an array tracking circuit 420, a status linked list circuit 422, and a status state machine circuit 424. Dequeue subsystem 412 can include a dequeue linked list circuit 426 and an arbitration circuit 428. RRC 208 also supports a plurality of different interfaces including an allocation interface 430, a notification interface 432, a dequeue interface 434, a read return interface 436, and an enqueue interface 438.

Figure 5:
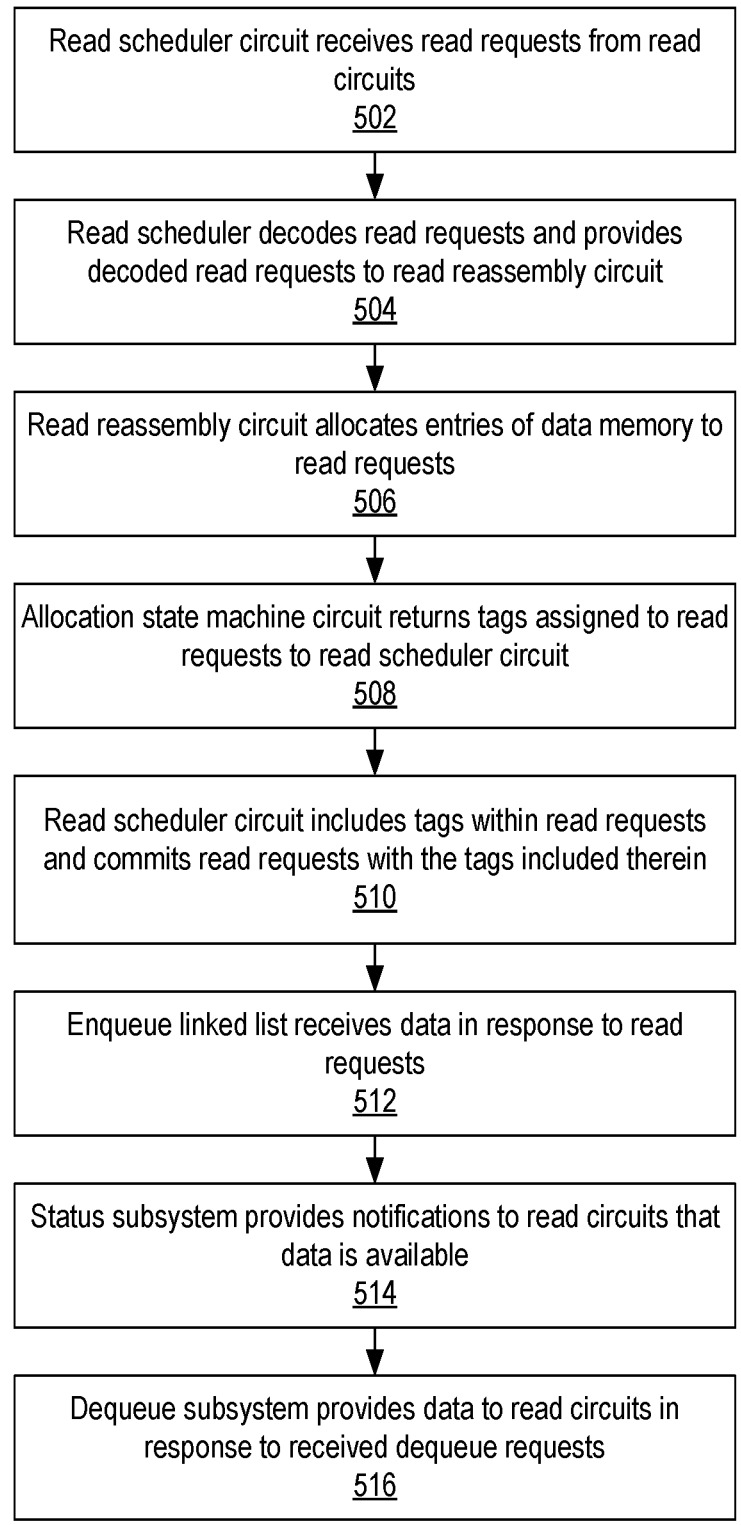
FIG. 5 illustrates another example method of operation of the DMA system of FIGS. 1, 2, and 4.

FIG. 5 illustrates another example method 500 of operation of DMA system 154. More particularly, method 500 illustrates the operation of read scheduler circuit 206 and RRC 208. Method 500 illustrates a more detailed example of the data re-ordering performed by RRC 208 as part of DMA system 154.

In block 502, read scheduler circuit 206 receives read requests from the different read circuits 202. Read scheduler circuit 206 is capable of arbitrating among different read requests received from read circuits 202 to select particular read requests for processing. In this regard, read scheduler circuit 206 is capable of ordering or scheduling received read requests for processing based on an arbitration scheme implemented therein. Each read request received specifies, at least in part, an amount of data being requested and a particular virtual channel that has been allocated to the read circuit 202 that issued the read request (e.g., the originating read circuit).

In block 504, read scheduler circuit 206 decodes the read requests and provides the read requests, as decoded, to the RRC 208. Each read request may have a maximum size (e.g., amount of data requested) that may be requested and that is returned in chunks corresponding to the read completion boundary (RCB) parameter that determines the naturally aligned address boundaries in which a read request may be serviced with multiple completions. Each received chunk of data is stored in an available entry of data memory 414.

For example, for each read request received, read scheduler circuit 206 is capable of determining a number of entries in data memory 414 required to store the data that will be received in response to the read request. The number of entries needed matches the number of chunks of data that will be received in fulfillment of the read request. In this example, each chunk may be received as a beat of data. As an example, if each entry of data memory 414 is capable of storing 128 bytes of data, read scheduler circuit 206 determines the number of entries of data memory 414 necessary to store the data received in response to each read request. In this regard, read scheduler circuit 206 is capable of splitting the read request into a number of chunks (e.g., beats) of data, where each chunk/beat occupies one entry of data memory 414.

In one or more example implementations, read scheduler circuit 206 sends the read requests, as decoded, to RRC 208. More particularly, read scheduler circuit 206 sends the decoded read requests to allocation state machine circuit 402 via allocation interface 430. Each of the decoded read requests may specify a number of entries needed for the read request and a particular virtual channel over which the read request was received from the originating read circuit 202. In one or more example implementations, the virtual channels may correspond to particular workloads, applications, and/or compute circuits depending on the particular context in which IC 150 is operating.

In block 506, RRC 208 allocates entries of data memory 414 to the read requests. As part of block 506, for example, allocation state machine circuit 402 queries free entry circuit 406 to determine available or free entries 418 for the read requests. Each read request will have one or more entries (e.g., pointers) allocated thereto based on the number of chunks or beats of data that will be received in fulfillment of that read request as determined by read scheduler circuit 206.

In addition, as part of block 506, allocation state machine circuit 402 queries free tag circuit 404 to determine free CSI tags 416 that may be assigned to the read requests. Whereas each read request may be assigned one or more entries, each read request is assigned one CSI tag. Allocation state machine circuit 402 assigns each read request a different CSI tag 416 obtained from free tag circuit 404, where the assigned CSI tag is used to uniquely identify the read request and differentiate the read request from other such requests. Block 506 illustrates that read scheduler circuit 206 and RRC 208 are operative to allocate memory to read requests prior to commitment (e.g., submission) of the read requests to another data processing system (e.g., to a host system or other system coupled through SoC 220).

The allocation of one or more entries of data memory 414 to each read request provides the pointers (e.g., addresses) for each of the entries also referred to herein as entry data. In one or more example implementations, as part of block 506, allocation state machine circuit 402 updates various data structures with the entries that have been allocated to the various read requests. For example, allocation state machine circuit 402 sends update information to each of status subsystem 408, enqueue linked list circuit 410, and dequeue subsystem 412 for each read request. The update information may specify the CSI tag of the read request, the virtual channel of the read request, and/or the entry data specifying the pointer(s) or address(es) of entries allocated to the read request.

Each of status subsystem 408, enqueue linked list circuit 410, and dequeue subsystem 412 is capable of updating data structures managed by each respective circuit to store the update information in one form or another. Enqueue linked list 410 for example, maintains linked lists organized by CSI tag. As such, linked lists of enqueue linked list circuit 410 may be indexed by CSI tag. Update information provided to linked list 410 may include, for each read request, the CSI tag assigned to the read request and one or more pointers specifying a respective entry or entries allocated to the read request. As the update information is received, the pointer(s) are pushed onto the particular linked list maintained therein corresponding to the CSI tag.

Status subsystem 408 (e.g., status linked list 422) and dequeue subsystem 412 (e.g., dequeue linked list circuit 426) each maintain linked lists organized by virtual channel. As such, status linked list circuit 422 and dequeue linked list circuit 426 are indexed according to virtual channel. That is, each of status linked list circuit 422 and dequeue linked list circuit 426 manages one linked list for each virtual channel. Update information provided to each of status subsystem 408 and dequeue subsystem 412 includes, for each read request, the virtual channel of the originating read circuit 202 of the read request and one or more pointers specifying a respective entry or entries allocated to the read request. For each of status linked list circuit 422 and dequeue linked list circuit 426, as the update information is received, the pointer(s) are pushed onto the particular linked list maintained in each respective circuit corresponding to the virtual channel. In this regard, among status subsystem 408, enqueue linked list circuit 410, and/or dequeue subsystem 412, for each read request, RRC 208 is capable of storing an association between the CSI tag of the read request, the virtual channel specified by the read request, and a pointer to each entry of the data memory allocated to the read request.

Within this disclosure, it should be appreciated that as data is added to a linked list, the data may be "pushed" onto the linked list. As data is consumed, the data is popped or removed from that linked list. Further, each of enqueue linked list circuit 410, status linked list circuit 422, and dequeue linked list circuit 426 may be implemented to include memory for storing the linked lists described herein and logic for pushing data onto the linked list(s) and popping data form the linked lists.

In block 508, allocation state machine circuit 402 returns the CSI tag(s) as allocated to the respective read requests to read scheduler circuit 206. For example, allocation state machine circuit 402 passes CSI tags assigned to read requests to read scheduler circuit 206 via allocation interface 430. The CSI tags, as provided to read scheduler circuit 206, are correlated with the particular read requests to which the CSI tags have been assigned.

In block 510, read scheduler circuit 206 includes the received CSI tags in the respective read requests and commits the read requests including the respective CSI tags therein. That is, read scheduler circuit 206 may include the CSI tag assigned to each read request within the respective read request and, once inserted, send the read request to the destination from which data is being requested. As such, each read request as committed includes the CSI tag assigned thereto by allocation state machine circuit 402.

In block 512, enqueue linked list circuit 410 receives data (e.g., read completions) from the various data sources (e.g., host systems) in response to the read requests as committed by read scheduler circuit 206. The received data, which may be received as individual beats of data, is received over enqueue interface 438. Each beat of data, as received, includes the CSI tag of the particular read request for which that beat of data was returned. As part of block 512, for each beat of data received, enqueue linked list circuit 410 determines the CSI tag specified by the beat of data. Enqueue linked list circuit 410 stores the beat of data in a selected entry of data memory 414 that is allocated to the read request having the same CSI tag as the beat of data. For example, enqueue linked list circuit 410 indexes to (e.g., locates) the particular linked list for the CSI tag specified by the beat of data and pops the next pointer in the linked list. Enqueue linked list circuit 410 then stores that beat of data in the entry of data memory 414 as specified by the popped pointer.

Enqueue linked list circuit 410 is also capable of notifying status subsystem 408 of the particular entry that was written with the beat of data. The notification may specify the particular entry that was written. For example, array tracking circuit 420 includes a bit location (e.g., memory) corresponding to each entry of data memory 414. As an entry of data memory 414 is written with valid data by enqueue linked list circuit 410, enqueue linked list circuit 410 is capable of setting the bit in array tracking circuit 420 mapped to the entry to indicate that the entry is storing valid data that may be made available to the originating read circuit 202.

In block 514, status subsystem 408 provides notifications to the respective read circuits 202 that data is available for the read requests. For example, in block 514, status state machine circuit 424 is capable of providing a notification to each read circuit 202 that submitted a read request for which a beat of data has been received. In the example, status linked list circuit 422 is capable of detecting which virtual channels have data available by monitoring array tracking circuit 420 for set bits.

Listing 1 below shows pseudo code illustrating an example method of operation for status linked list circuit 422.

Listing 1

```
for (i = 0; i < NUM_CHANNEL; i++) {
    if (array_tracking[status_ll_head_ptr[i]] == 1)
        channel_available[i] = 1;
}
```

Listing 1 illustrates that status linked list circuit 422 is capable of checking whether each of the 24 linked lists maintained therein has a head pointer pointing to an entry of data memory 414 that is storing valid data. That is, status linked list circuit 422 determines whether a linked list (and as such a virtual channel) has data available by determining whether a bit in array tracking circuit 420 corresponding to the head pointer of the list is set. Appreciably, status linked list circuit 422 may index into array tracking circuit 420 based on the value specified by the head pointer stored in a linked list. For example, status linked list circuit 422 determines the address specified by the head pointer and checks whether the corresponding bit in array tracking circuit 420 is set. If so, the virtual channel corresponding to the linked list just read has available data. In response to detecting a set bit, status linked list circuit 422 may notify state machine circuit 424 of the virtual channel that has data available. Once data is determined to be available of for a given head pointer of a linked list, the pointer may be popped.

Status state machine circuit 424 is capable of arbitrating among the different virtual channels that have data available and sending notifications for the virtual channels with available data over notification interface 432. As the virtual channels are allocated to the read circuits 202, the originating read circuit(s) 202 will receive the notification(s) as each is configured to monitor for notifications on their respective virtual channels. Thus, each read circuit 202 receives notifications of available beats of data (e.g., on a per beat basis) as the beats of data are received.

Appreciably, data received via enqueue interface 438 is organized and stored using the CSI tags described. As read circuits are unaware of the tagging scheme implemented, virtual channels are used for purposes of sending notifications and for sending data to read circuits 202 as described in greater detail below.

In accordance with the inventive arrangements, as read completion data arrives in RRC 208, one set of 24 linked lists as managed by status linked list circuit 422 is used to track the availability of in-order data. Once in-order data is detected, a notify signal is returned to the originating read circuit 202. In the examples described herein, the read circuits 202 decide when to retrieve available data. Each of read circuits 202, for example, is capable of determining when to obtain available data for a particular virtual channel.

In block 516, the dequeue subsystem 412 provides data to read circuits 202 in response to received dequeue requests. For example, as read circuits 202 that have been notified of the availability of data by status state machine circuit 424 make the determination to retrieve that data, the read circuits 202 submit dequeue requests over dequeue interface 434 to arbitration circuit 428. Arbitration circuit 428 employs an available or known arbitration technique to schedule the dequeue requests for service.

In one or more example implementations, each dequeue request may specify a particular virtual channel corresponding to a virtual channel over which a notification of available data has been received. Each of read circuits 202, for example, may track the particular virtual channels allocated to that read circuit that have data based on the received notifications. The dequeue request passed by arbitration circuit 428 to dequeue linked list circuit 426 may be processed. In the example, dequeue linked list circuit 426 indexes to the correct linked list using the virtual channel specified by the dequeue request. Dequeue linked list circuit 426 pops an entry (e.g., pointer) from the linked list and reads the data from the entry indicated by the popped pointer. Data read from the data memory 414 is provided via read return interface 436 by providing the data in association with the virtual channel specified by the dequeue request.

Read circuits 202 may continue to issue dequeue requests for data as those read circuits are ready to receive the data. Data is provided to originating read circuits 202 in order for each read request and in order for each virtual channel. Appreciably, data received for the read requests may not come back from the host system(s) in the same order as the read requests were committed. Data for a given CSI tag (read request) does come back in order. Still, while the beats of data for each read request are received in order, beats of data for other read requests may be comingled among beats of data for any given read request. The architecture described allows shared reorder circuitry to provide in-order (e.g., re-ordered) data over a plurality of different virtual channels to the read circuits in a non-blocking manner as each read circuit may be assigned a plurality of virtual channels. The data that is output is provided in order for each respective virtual channel as scheduled by arbitration circuit 428.

In one or more example implementations, having read out data from one or more entries, dequeue linked list circuit 426 may update the available entries 418 in free entry circuit 406. That is, those entries that have been read may be added to entries 418 as free or available. In addition, in response to determining that each beat of data for a given CSI tag has been read from data memory 414, dequeue linked list circuit 426 is capable of indicating to free tag circuit 404 that the CSI tag is now available or free (e.g., that available CSI tag is added to tags 416). Appreciably, dequeue linked list circuit 426 is capable of indicating to free tag circuit 404 that the CSI tag is free in response to the entire read request has been satisfied (e.g., when full read completion has been dequeued from RRC 208).

The example implementations illustrate a circuit architecture where data is enqueued (e.g., stored) in data memory 414 according to CSI tags assigned to the read requests. Data received in response to the read requests may be provided to originating read circuits based on virtual channels. That is, data output from RRC 208 is provided from RRC 208 to the originating read circuits in order with respect to individual CSI tags and in order with respect to individual virtual channels.

In the examples described within this disclosure, data is described as being returned from one or more host systems coupled to controllers 214. In addition or in the alternative, data may be requested from and returned by circuits and/or systems that are accessed by way of SoC 220. In such cases, where AXI interfaces are used, AXI identifiers may be used as CSI tags. In still other example implementations, the AXI identifiers may be mapped to the CSI tags described herein so that one tag convention is used across each data source accessible by DMA system 154.

In one or more example implementations, configuration registers may be included in RRC 208 that specify fill levels on a per read circuit basis and/or a per read request destination (e.g., PCIE0-3 or PSX Bridge) basis. The fill levels specified by the registers (not shown) may be used to throttle the bandwidth of DMA system 154.

The example implementations described within this disclosure provide a centralized architecture capable of re-ordering read completion data among a plurality of read circuits. The example circuit architectures described herein provide improved area usage in the target IC and improved performance. The RRC manages and/or provides buffer space that is dynamically shared between a plurality of virtual channels. Each virtual channel is implemented as an independent linked list capable of returning read completion data as soon as the first in-order beat of such data is available. This prevents head-of-line blocking between various applications (e.g., compute circuits) that use DMA system 154.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "data processing system" means one or more hardware systems configured to process data, each hardware system including at least one hardware processor and memory. The hardware processor is programmed with computer-readable instructions that, upon execution, initiate operations.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the terms "computer-readable program code," "computer readable program instructions," "program code," and "program instructions" are used interchangeably. Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A direct memory access (DMA) system, comprising:
a plurality of read circuits;
a switch coupled to a plurality of data port controllers configured to communicate with one or more data processing systems;
a read scheduler circuit coupled to the plurality of read circuits and the switch, wherein the read scheduler circuit is configured to receive read requests from the plurality of read circuits, request allocation of entries of a data memory for the read requests, and submit the read requests to the one more data processing systems via the switch; and
a read reassembly circuit coupled to the plurality of read circuits, the switch, and the read scheduler circuit, wherein the read reassembly circuit is configured to:
assign tags to the read requests, wherein the tags are inserted into the read requests by the read scheduler circuit;
reorder beats of read completion data received from the switch for the read requests based on the tags corresponding to the read requests that are included in the beats of the read completion data; and
provide the read completion data, as reordered, to the plurality of read circuits; wherein the plurality of read circuits are allocated a plurality of virtual channels, the read reassembly circuit stores associations of tags to read requests and to the plurality of virtual channels over which the read requests are received, and delivers reordered read completion data to particular ones of the plurality of read circuits based on the stored association of tags to virtual channels; and
wherein the read reassembly circuit is configured to notify the plurality of read circuits that data is available in response to receiving individual beats of the read completion data for the read requests based on the tags included in the individual beats of the read completion data and particular ones of the plurality of virtual channels associated with the tags.

2. The DMA system of claim 1, wherein the read scheduler circuit, for each read request, determines a number of the entries of the data memory required for the read request and requests allocation of the number of entries of the data memory for the read request from the read reassembly circuit prior to commitment of each read request.

3. The DMA system of claim 1, wherein the plurality of data port controllers are configured to communicate with a plurality of data processing systems, the read requests are submitted to the plurality of data processing systems, and the beats of the read completion data are received from the plurality of data processing systems prior to the reordering.

4. A direct memory access (DMA) system having a read reassembly circuit, wherein the read reassembly circuit comprises:
an allocation state machine circuit configured to receive read requests from a plurality of read circuits of the DMA system, allocate entries of a data memory to the read requests as received, and assign tags to the read requests;
an enqueue linked list circuit configured to receive beats of data for the read requests and store the beats of the data in the entries of the data memory based on the allocation performed by the allocation state machine circuit and the tags of the read requests that are found within the beats of the data;
a status subsystem configured to notify respective read circuits of the plurality of read circuits that the data for the read requests submitted by the respective read circuits is available; and
a dequeue subsystem configured to receive dequeue requests from the plurality of read circuits and, in response to the dequeue requests, provide the data obtained from the entries of the data memory to the plurality of read circuits;
wherein the status subsystem comprises:
an array tracking circuit configured to store indications of which entries of the data memory store valid data returned for the read requests;
a status linked list circuit configured to correlate pointers to entries assigned to the read requests with a plurality of virtual channels assigned to the plurality of read circuits and the indications stored in the array tracking circuit; and
a status state machine circuit configured to generate notifications directed to respective read circuits for selected virtual channels that have data available for the read requests; and
wherein each read circuit of the plurality of read circuits is allocated one or more virtual channels of the plurality of virtual channels, and wherein the dequeue subsystem provides the data to different ones of the plurality of read circuits in-order on a per read request basis and in-order on a per virtual channel basis.

5. The DMA system of claim 4, wherein the allocation state machine circuit allocates a number of entries in the data memory to each read request based on an amount of the data to be returned in response to the read request.

6. The DMA system of claim 4, wherein the status subsystem is operable to notify the plurality of read circuits in response to storing the beats of the data in the entries of the data memory.

7. The DMA system of claim 4, wherein the dequeue subsystem comprises:
a dequeue arbitration circuit configured to receive the dequeue requests and arbitrate among the dequeue requests as received.

8. The DMA system of claim 7, wherein each dequeue request specifies a virtual channel, and wherein the dequeue subsystem comprises: a dequeue linked list circuit configured to initiate read operations to the data memory for the data stored in the entries of the data memory allocated to the read requests based on a virtual channel specified by each dequeue request;
wherein the dequeue linked list circuit initiates the read operations in an order determined by the dequeue arbitration circuit.

9. A method of data re-ordering for a direct memory access (DMA) system, the method comprising:
receiving read requests from a plurality of read circuits of the DMA system;
allocating entries of a data memory and assigning tags to the read requests;
in response to receiving beats of data for the read requests, storing the beats of the data in the entries of the data memory as allocated based on the tags corresponding to the read requests included in the beats of the data;
in response to storing the beats of the data in the entries, notifying respective read circuits of the plurality of read circuits that the data for the read requests submitted by the respective read circuits is available;
sending the data obtained from the entries of the data memory to the respective read circuits in response to receiving dequeue requests from the respective read circuits, wherein the data is provided in-order on a per read request basis; wherein each read circuit of the plurality of read circuits is allocated one or more virtual channels of a plurality of virtual channels, wherein each read request specifies a particular virtual channel allocated to a particular read circuit that issued the read request, and wherein the data is provided in-order on a per virtual channel basis;
storing associations between the tags assigned to the read requests, the entries as allocated to the read requests, and the virtual channels over which the read requests are received for directing reordered beats of the data to respective ones of the plurality of read circuits;
wherein each read circuit of the plurality of read circuits is allocated one or more virtual channels of a plurality of virtual channels;
storing associations between entries of the data memory that store valid data for the read requests and the plurality of virtual channels;
determining selected virtual channels associated with the entries in the data memory storing valid data; and
providing notifications to the respective read circuits based on the selected virtual channels.

10. The method of claim 9, wherein entries of the data memory are allocated and the tags are assigned prior to submission of the read requests to another data processing system.

11. The method of claim 9, further comprising, for each beat of data received responsive to a read request:
determining the tag specified by the beat of data; and
storing the beat of data in a selected entry of the data memory that is allocated to the read request having a same tag as the beat of data based on the stored associations.

12. The method of claim 9, further comprising:
receiving the dequeue requests from the plurality of read circuits;
arbitrating among the dequeue requests; and
sending in-order data to each read circuit based on the arbitrating.

* * * * *